US007969906B2

(12) United States Patent
Takeda et al.

(10) Patent No.: US 7,969,906 B2
(45) Date of Patent: Jun. 28, 2011

(54) BROADCAST MESSAGING IN PEER TO PEER OVERLAY NETWORK

(75) Inventors: Yutaka Takeda, Foster City, CA (US);
Howard Berkey, Foster City, CA (US);
Payton R. White, Foster City, CA (US);
Attila Vass, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/761,318

(22) Filed: Apr. 15, 2010

(65) Prior Publication Data

US 2010/0195652 A1   Aug. 5, 2010

Related U.S. Application Data

(63) Continuation of application No. 12/330,267, filed on Dec. 8, 2008, now Pat. No. 7,729,280, which is a continuation of application No. 11/291,121, filed on Nov. 29, 2005, now Pat. No. 7,468,952.

(51) Int. Cl.
*H04L 1/00* (2006.01)
*H04L 12/28* (2006.01)
(52) U.S. Cl. .................. 370/252; 370/390; 370/401
(58) Field of Classification Search .......... 370/252–255, 370/389–392, 400–405
See application file for complete search history.

(56) References Cited

U.S. PATENT DOCUMENTS

| 5,666,360 | A | 9/1997 | Chen et al. |
| 6,952,401 | B1 | 10/2005 | Kadambi et al. |
| 7,379,428 | B2 * | 5/2008 | Xu et al. .................. 370/254 |
| 2002/0009084 | A1 | 1/2002 | Kalkunte |
| 2004/0210624 | A1 * | 10/2004 | Andrzejak et al. ............ 709/201 |
| 2006/0087986 | A1 * | 4/2006 | Dube et al. .................... 370/255 |
| 2006/0239275 | A1 * | 10/2006 | Zlateff et al. ................ 370/400 |
| 2007/0002869 | A1 * | 1/2007 | Miller ...................... 370/395.32 |

FOREIGN PATENT DOCUMENTS

| EP | 1 345 359 A1 | 9/2003 |
| EP | 1 533 952 A1 | 5/2005 |

OTHER PUBLICATIONS

Rowstron and Druschel, "Pastry: Scalable, decentralized object location and routing for large-scale peer-to-peer systems." Proc. of the 18th IFIP/ACM International Conference on Distributed Systems Platforms (Middleware 2001). Heidelberg, Germany, Nov. 2001.
Stoica et al., "Chord: A Scalable Peer-to-Peer Lookup Protocol for Internet Applications." IEEE/ACM Transactions on Networking, vol. 11, No. 1, Feb. 2003.

* cited by examiner

*Primary Examiner* — Hong Cho
(74) *Attorney, Agent, or Firm* — Kilpatrick Townsend & Stockton LLP

(57) ABSTRACT

Broadcast messages are efficiently directed to nodes of an overlay network. Broadcast messages include an End ID parameter specifying the range of key values for nodes that should receive the broadcast message. Each node of an overlay network maintains a list of finger nodes and their respective key values. Upon receiving a broadcast message, a node assigns a finger node a new End ID value based upon the End ID value of the broadcast message or the key value of an adjacent finger node. The node compares a finger node's new End ID value with the finger node's key value to determine whether to forward the broadcast message to that finger node. A broadcast message forwarded to a finger node includes an End ID parameter equal to the new End ID value determined for the finger node. Nodes can aggregate response messages from its finger nodes.

20 Claims, 13 Drawing Sheets

BROADCAST MESSAGING IN PEER TO PEER OVERLAY NETWORK

CROSS-REFERENCES TO RELATED APPLICATIONS

The present application is a continuation application of, and claims priority to, U.S. Non-Provisional Application No. 12/330,267, filed Dec. 8, 2008, now issued U.S. Pat. No. 7,729,280, which is a continuation application of, and claims priority from U.S. Non-Provisional Application No. 11/291,121, filed on Nov. 29, 2005, now U.S. Pat. No. 7,468,952, issued Dec. 23, 2008, both entitled "Broadcast Messaging in Peer to Peer Overlay Network," which are hereby incorporated herein by reference.

BACKGROUND OF THE INVENTION

The present disclosure relates to the field of data networks, and in particular to peer to peer overlay networks. Peer to peer networks are distributed data networks without any centralized hierarchy or organization. Peer to peer data networks provide a robust and flexible means of communicating information between large numbers of computers or other information devices, referred to in general as nodes.

An overlay network is a logical or virtual network organization that is imposed on nodes connected by one or more types of underlying physical network connections. In an overlay network, nodes are connected by virtual or logical links, each of which can correspond with one or more paths in an underlying physical network. Overlay network are typically implemented in hardware and/or software operating in the application layer or other top-level layer of an OSI network stack or other type of networking protocol.

One class of peer to peer overlay networks are referred to as distributed hash table networks. Distributed hash table overlay networks use a hash function to generate and assign one or more key values to a unique node. The set of all possible key values is referred to as a hash space. Nodes are organized in the hash space according to their assigned key values. The hash function is selected so that nodes are approximately evenly distributed throughout the hash space. Distributed hash table overlay networks are typically highly scalable, often supporting millions of nodes; robust, allowing nodes to join or leave frequently; and efficient, routing a message to a single destination node quickly.

There are numerous different types of distributed hash table overlay networks. One type of peer to peer overlay network is a chord network. The chord overlay network protocol is described in detail in "Chord: A Scalable Peer-to-peer Lookup Protocol for Internet Applications", Ion Stoica, Robert Morris, David Liben-Nowell, David R. Karger, M. Frans Kaashoek, Frank Dabek, Hari Balakrishnan, *IEEE/ACM Transactions on Networking*, Vol. 11, No. 1, pp. 17-32, February 2003.

Although distributed hash table overlay network protocols, such as the chord protocol, provide efficient distribution of a message to a single destination node, they do not allow for a single message to be efficiently distributed to multiple destination nodes, referred to as broadcasting a message.

In one typical implementation, a node desiring to broadcast a message to all of the other nodes must send a message to each node separately. As each node only has direct knowledge of a limited number of nodes, a node initiating a broadcast message, referred to as an initiating node, must blindly send messages to all possible key values. For distributed hash table networks, this entails sending a separate message to each possible key value. For a distributed hash table network with a hash space of 2^160 (arising from the use of a 160-bit hash function such as SHA-1), this is unfeasible.

In another typical implementation, a flooding approach is used to distribute a broadcast message. An initiating node sends a message to all of the nodes directly connected with the initiating node in the overlay network. Upon receiving the message, each receiving node in turn forwards the message to any additional nodes directly connected with each receiving node in the overlay network. This implementation is inefficient, as some nodes receive redundant messages. Moreover, this implementation consumes a large amount of network bandwidth and takes a large amount of time to operated.

To reduce the bandwidth required by flooding broadcast messages, a modified flooding scheme assigns a time-to-live (TTL) value to each broadcast message. Each time a copy of a broadcast message is forwarded to additional node, its TTL value is decremented. When the TTL value reaches 1, the broadcast message is no longer forwarded. Although this modified flooding scheme reduces the amount of wasted network bandwidth and the number of duplicate messages, it cannot ensure that the broadcast message will be routed to all nodes.

It is therefore desirable for a system and method to guarantee each node in a peer to peer overlay network receives a broadcast message. It is further desirable that the system and method guarantees that each node in a peer to peer overlay network receives only one copy of a broadcast message, thereby ensuring that network bandwidth is efficiently utilized. It is further desirable that the system and method require minimal time and bandwidth resources from a node initiating a broadcast message. It is also desirable that the system and method enable broadcast messages to be selectively directed to portions of the overlay network with no additional network bandwidth overhead. It is desirable for the system and method to deliver broadcast messages to all or a selected portion of the peer to peer overlay network within a minimal time period. It is desirable for the system and method to enable efficient aggregation of query results from nodes in a peer to peer overlay network.

BRIEF SUMMARY OF THE INVENTION

An embodiment of the invention efficiently directs broadcast messages to nodes of an overlay network without wasting network bandwidth on duplicate messages or unintentionally omitting any nodes. Broadcast messages include an End ID parameter. The End ID parameter specifies the range of key values for nodes that should receive copies of the broadcast message. Each node maintains a list of finger nodes and their respective key values. Upon receiving a broadcast message, a node assigns each finger node a new End ID value based upon the End ID value of the received broadcast message or the key value of an adjacent finger node. The node compares each finger node's new End ID value with the finger node's key value to determine whether to forward the broadcast message to that finger node. A broadcast message forwarded to a finger node includes an End ID parameter equal to the new End ID value determined for the finger node. Nodes can respond to broadcast messages and aggregate response message from its finger nodes.

In an embodiment, a method of processing a broadcast message in an overlay network includes receiving a broadcast message including an End ID from a sending node. The End ID specifies a range of key values for finger nodes that should receive copies of the broadcast message. The method selects an entry of a finger table. Each entry of the finger table includes a reference to a finger node and a key value associated with the finger node.

An embodiment of the method determines if there is a following entry of the finger table. The following entry includes a key value adjacent to the key value of the selected finger table entry according to a node order. The method sets a new End ID value to the key value associated with the following entry in response to the determination that there is a following entry of the finger table. The method sets a new End ID value to the End ID of the received broadcast message in response to the determination that there is not a following entry of the finger table. The method comparing the key value of the selected finger table entry with the new End ID value and forwards a copy of the broadcast message with the new End ID value to the finger node of the selected entry in response to a determination that the key value of the selected finger table entry is within the range of key values specified by the new End ID value.

In a further embodiment, the finger table includes two or more entries arranged according to their respective key values. In an embodiment, the node order is ascending according to key values. In another embodiment, the node order is descending according to key values.

In an additional embodiment, the method stores a reference to a sending node communicating the broadcast message. The method receives a response message from at least one finger node in response to the forwarded copy of broadcast message and aggregating the received response messages into a combined response message. The combined response message is forwarded to the sending node.

In still another embodiment, the method can receive a response to the broadcast message and include the response in the combined response message. In yet another embodiment, the combined response message includes response messages from one or more nodes in a compact representation created using a frequency domain transformation.

BRIEF DESCRIPTION OF THE DRAWINGS

The invention will be described with reference to the drawings, in which.

In the drawings, the use of identical reference numbers indicates identical or similar elements.

DETAILED DESCRIPTION OF THE INVENTION

Figure 1A:
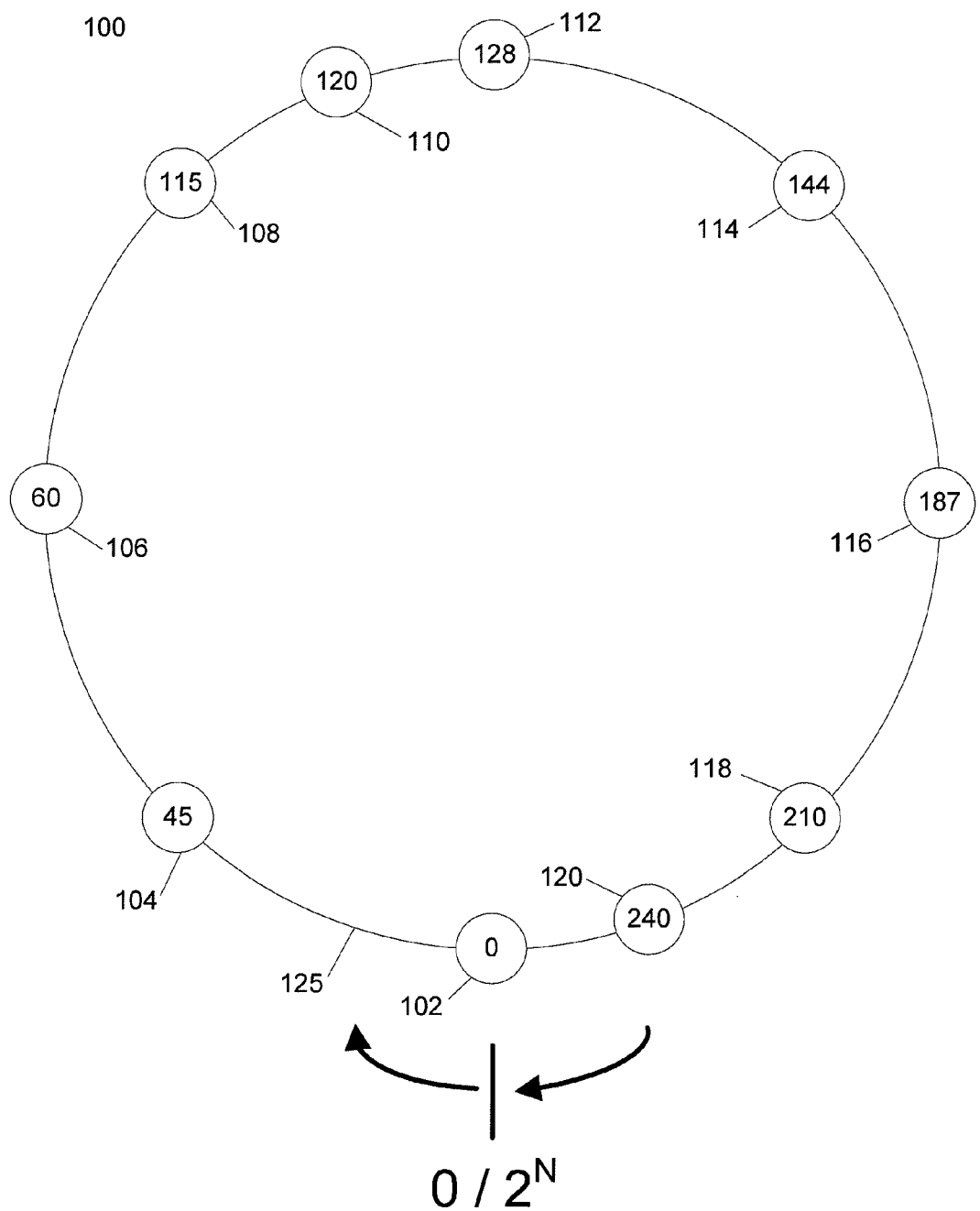
FIGS. 1A and 1B illustrate an example chord overlay network suitable for use with an embodiment of the invention.
Figure 1B:
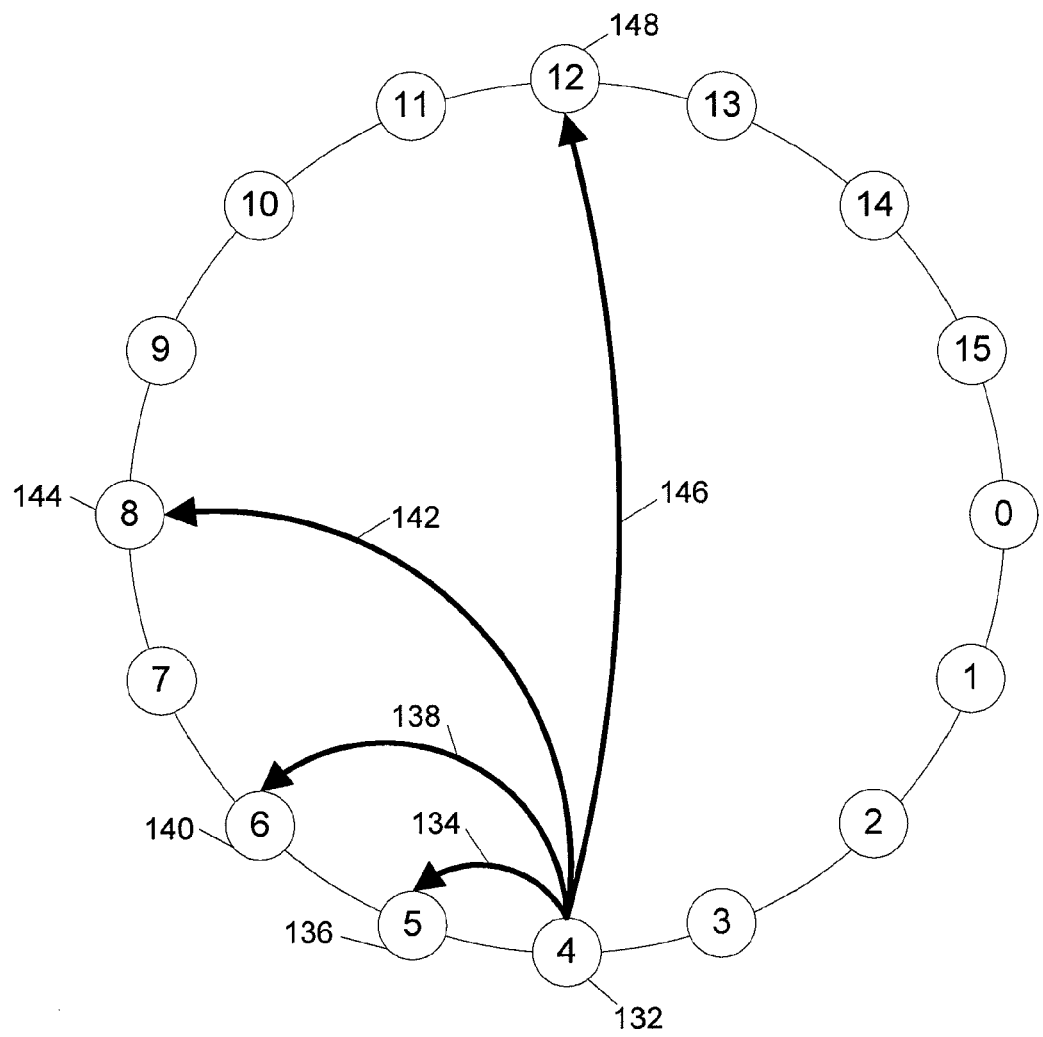

FIGS. 1A and 1B illustrate an example chord overlay network suitable for use with an embodiment of the invention. FIG. 1A illustrates an example chord overlay network 100 including numerous nodes, such as nodes 102, 104, 106, 108, 110, 112, 114, 116, 118, and 120. Each node is assigned one or more key values. For example, nodes 102, 104, 106, 108, 110, 112, 114, 116, 118, and 120 are assigned key values 0, 45, 60, 115, 120, 128, 144, 187, 210, and 240, respectively.

The nodes of the overlay network are arranged by their assigned key values in the hash space 125, or set of all possible key values. In FIG. 1A, the hash space 125 is shown as a ring configuration of all possible key values from 0 to $2^N$, with N being the number of bits allocated for a key value. In some implementations, N equals 160 bits, which is the size of the output of typical hash functions such as SHA-1 and is sufficiently large to avoid hash collisions. In this implementation, the chord overlay network 100 supports up to $2^{160}$ nodes and a typical chord overlay network can include millions of active nodes. Other implementations can use more or less hash bits.

In some implementations, each node is assigned a key value randomly. In some implementations, each node is assigned a key value based upon the results of a hash function of one or more attributes of the node. The hash function is selected so that nodes are approximately evenly distributed throughout the hash space 125. In additional implementations, the assignment of key values to nodes is based at least in part on the topology of the underlying physical network. In these implementations, nodes are distributed approximately evenly throughout the hash space 125; however, the overlay network 100 attempts to ensure that nodes located in close proximity in the physical network are also located in close proximity in the hash space 125 of the overlay network as well.

Based upon the arrangement of nodes in the hash space 125, each node includes a reference to one or more adjacent nodes. In some implementations of a chord overlay network 100, each node includes a reference to the preceding and succeeding adjacent nodes. For example, node 106, with a key value of 60, can include references to nodes 104 and 108, having key values of 45 and 115, respectively. If a new node is added with a key value between that of nodes 106 and 108, such as a key value of 100, the appropriate reference of node 106 will be adjusted accordingly.

In a further implementation, each node includes a finger table including references to one or more nearby nodes. Each finger table entry references the node nearest to a key value specified by an offset from the key value of the present node. In some of these implementations, each finger table entry's offset corresponds with a binary place value. For example, a first finger table entry has an offset value of one ($2^0$), a second finger table entry has an offset value of two ($2^1$), a third finger table entry has an offset value of four ($2^2$), a fourth finger table entry has an offset value of eight ($2^3$), and so forth. In other implementations, different offset values can be associated with each finger table entry.

FIG. 1B illustrates an example of the node relationships specified by finger table entries in an overlay network 130 according to this implementation. Node 132, having a key value of four, includes a first finger table entry specifying a reference 134 to node 136, which has a key value of five, corresponding with an offset value of one. A second finger table entry of node 132 specifies a reference 138 to node 140, which has a key value of six, corresponding with an offset value of two from the node 132. Similarly, a third finger table entry of node 132 specifies a reference 142 to node 144, which has a key value of eight, corresponding with an offset value of four from node 132. A fourth finger table entry of node 132 specifies a reference 146 to node 148, which has a key value of twelve, corresponding with an offset value of eight from node 132. Each of the other nodes of overlay network 130 has a similar finger table specifying references to other nodes.

Finger tables can have any arbitrary number of entries. Larger finger tables can decrease routing time for messages, at the expense of more complicated maintenance overhead for adding or removing nodes. For example, if a key value is comprised of N bits, each node may have a finger table with N entries. In other implementations, other finger table sizes may be optimal depending upon the application.

Figure 1C:
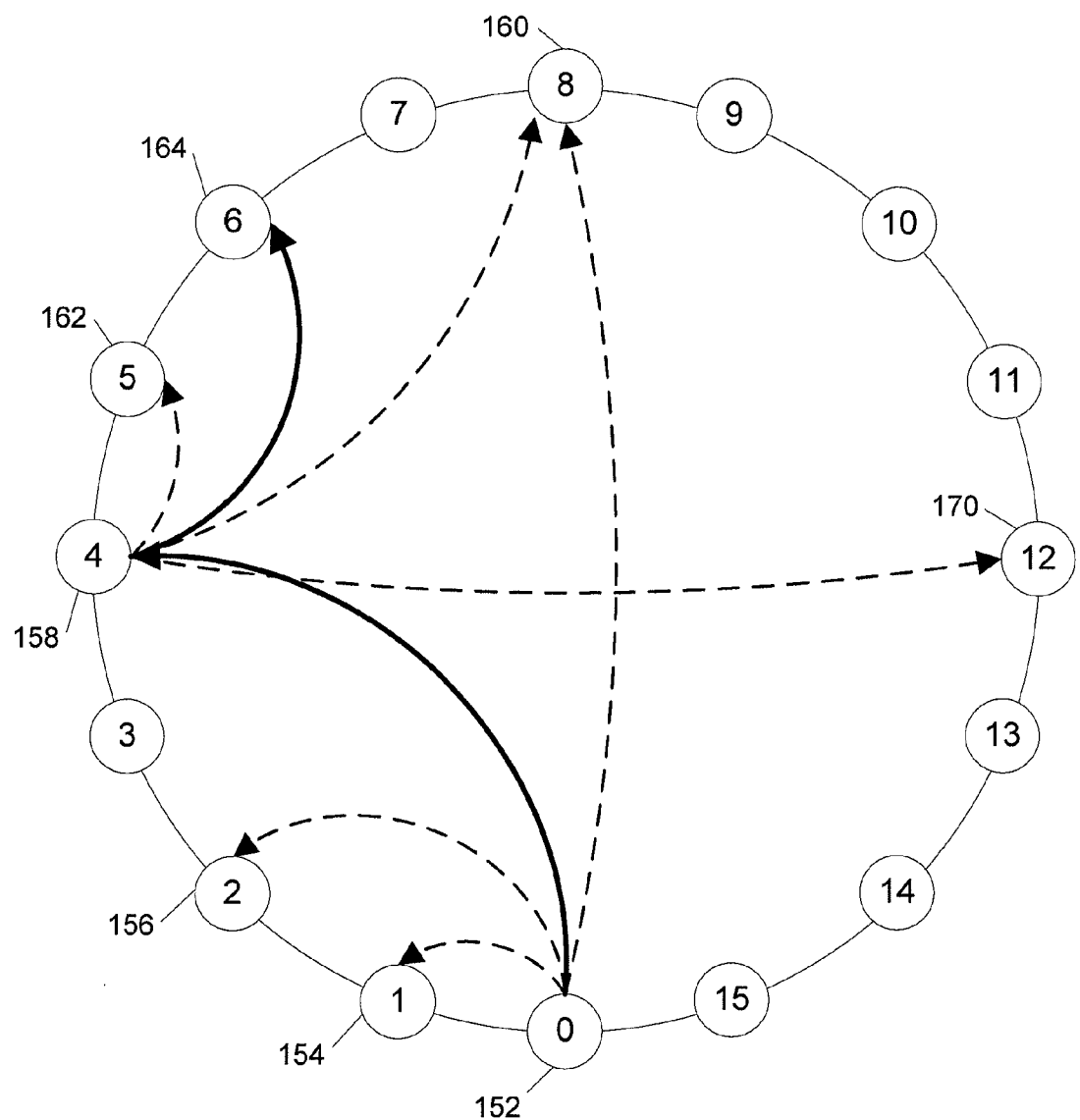
FIG. 1C illustrates an example routing of a message in an overlay network according to an embodiment of the invention.

In this implementation of an overlay network, each node only knows the location of the nodes specified by references in its finger table. However, nodes are capable of sending messages to any other node in the overlay network via one or more intermediate nodes. FIG. 1C illustrates an example routing of a message in an overlay network 150 according to this implementation.

In the example of FIG. 1C, node 152, having a key value of 0, directs a message to node 164, having a key value of 6. The finger table of node 152 has references to nodes 154, 156, 158, and 160, having key values of 1, 2, 4, and 8, respectively. To deliver a message to node 164 with a key value of 6, node 152 forwards the message to the node in its finger table having the largest key value less than or equal to the key value of the destination node. In this example, node 152 forwards the message to node 158, having a key value of 4. In the finger table of node 152, node 158 has the largest key value, 4, that is less than or equal to the destination node key value of 6.

Upon receiving a message directed to node 158, with a key value of 6, node 158 uses its own finger table to identify a node having the largest key value less than or equal to the destination node key value. In this example, node 158, with a key value of 4, has a finger table with references to nodes 162, 164, 160, and 170, having key values of 5, 6, 8, and 12, respectively. Based on its finger table, node 158 forwards the message to node 164, having a key value of 6, which is the desired destination key value.

Although the overlay networks described above can route messages to single nodes efficiently, there is no mechanism for efficiently forwarding broadcast messages to all or a substantial portion of the overlay network. Each node has direct knowledge of only the nodes in its finger table. Thus, to send a message to all of the nodes in the overlay network, a node initiating a broadcast message, referred to as an initiating node, must send separate messages to each possible key value. For a hash space of $2^{160}$, there is an astronomical number of key values, which makes this approach impractical.

As described above, a flooding approach to directing broadcast messages wastes network bandwidth and may not guarantee that the broadcast message will be routed to all nodes. In a flooding approach, each node forwards a received broadcast message to all of the other nodes that it is connected with. Thus, in the overlay network 150, node 152 would forward a broadcast message to nodes 154, 156, 158, and 160. Each node in turn would forward the received broadcast message to the nodes in its finger table. For example, node 158 would forward the broadcast message to nodes 162, 164, 160, and 170. As can be seen in FIG. 1C, node 160 receives the broadcast message at least twice, from node 152 and then from node 158.

Figure 2:
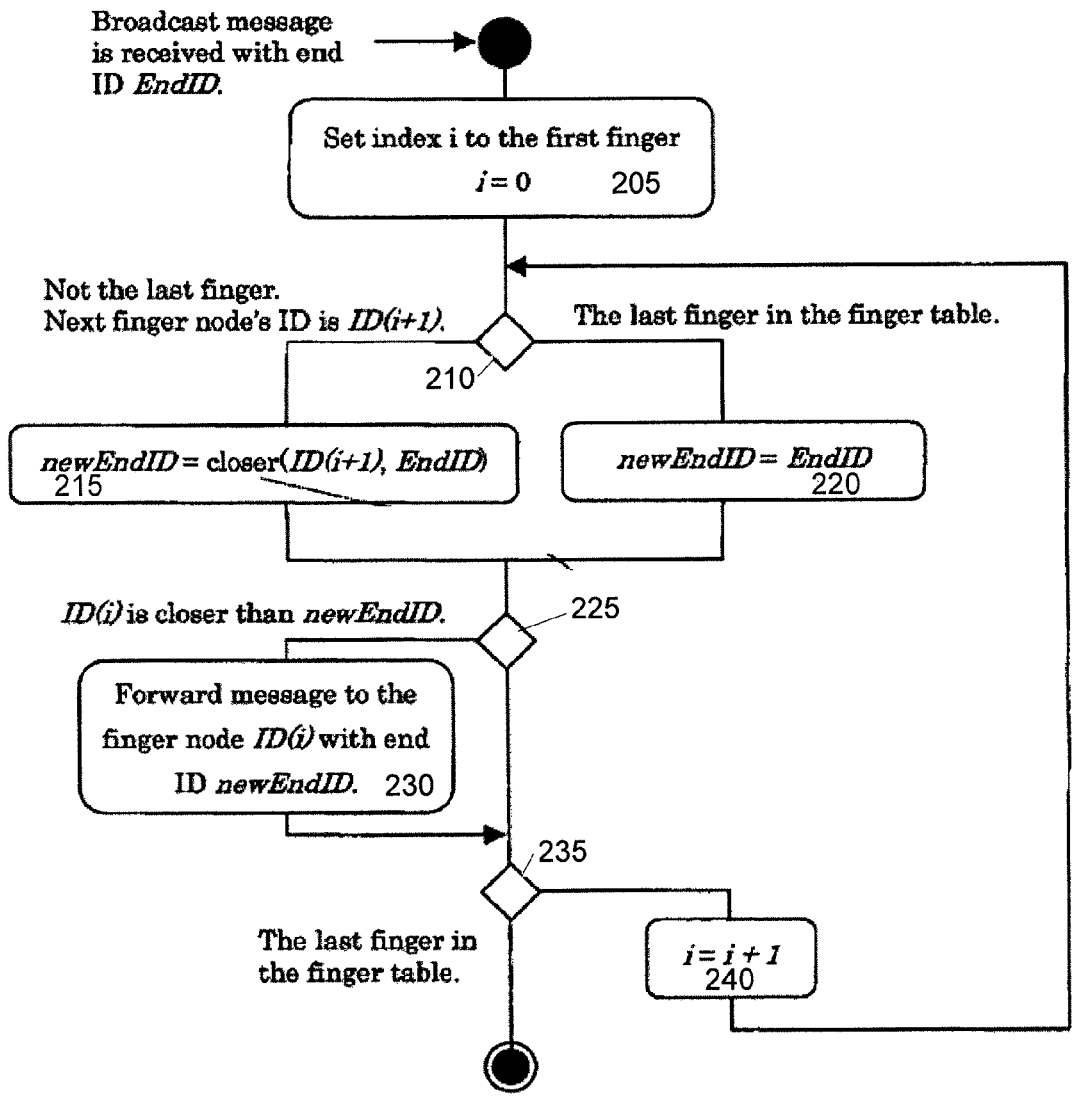
FIG. 2 illustrates a method of routing a broadcast message in an overlay network according to an embodiment of the invention.

FIG. 2 illustrates a method 200 of routing a broadcast message in an overlay network according to an embodiment of the invention. Method 200 efficiently directs broadcast messages to all of the nodes in the overlay network without wasting network bandwidth on duplicate messages or omitting any nodes.

Method 200 is initiated upon a node receiving a broadcast message. In an embodiment, each broadcast message includes an End ID parameter. The End ID parameter represents the range of key values of nodes that the broadcast message may be forwarded to. For example, if a node receives a broadcast message with an End ID value of 17, then the node may forward a copy of the broadcast message to any node in its finger table with a key value less than 17. Furthermore, each forwarded copy of the broadcast message is assigned an End ID value according to method 200 to prevent duplicate messages from being sent to nodes.

A received broadcast message is processed by a node as follows. In step 205, the node sets an index value i to the first entry of the node's finger table. In decision block 210, the node determines whether the finger table entry specified by the index value i, referred to as the selected finger table entry, is the last entry of the node's finger table. If so, then method 200 proceeds from decision block 210 to step 220. Step 220 assigns the parameter newEndID to be equal to the End ID of the received broadcast message.

Conversely, if the node determines that the selected finger table entry is not the last entry of the node's finger table, method 200 proceeds from decision block 210 to step 215. Step 215 assigns the parameter newEndID to be equal to the key value of the next finger table entry (i.e. the finger table entry specified by index i+1) or the End ID of the received broadcast message, whichever is closer to the current node in the hash space. The distance between the current node and a key value, such as the next finger table entry or the current End ID, can determined in an embodiment by subtracting the current node's key value from the other key value.

In this embodiment of step 215, it is assumed that the entries of the finger table are arranged in order of the key values of their respective nodes and that broadcast messages are to be communicated to nodes in order of increasing key values. However, in alternate embodiments, the finger table can be arranged in a different order. In these embodiments, step 215 assigns the parameter newEndID to be equal to the finger table entry key value greater than and closest to the key value of the selected finger table entry. This embodiment communicates broadcast messages to nodes in order of increasing key values. In a further embodiment, if broadcast messages are to be communicated to nodes in order of decreasing key values, then step 215 assigns the parameter newEndID to be equal to the finger table entry key value less than and closest to the key value of the selected finger table entry.

Following step 215 or step 220, method 200 proceeds to decision block 225. In decision block 225, the node determines if the key value of the selected finger table entry is less than the value of the newEndID parameter. If so, method 200 proceeds to step 230. Otherwise, method 200 proceeds directly to decision block 235.

Step 230 forwards a copy of the broadcast message to the node associated with the selected finger table entry. The forwarded copy of the broadcast message includes an End ID value set to the value of the newEndID parameter.

Following decision block 225 or step 230, method 200 proceeds to decision block 235. Decision block 235 determines if the selected finger table entry is the last entry of the node's finger table. If so, then method 200 ends and the node is finished forwarding the broadcast message.

If decision block 235 determines that the selected finger table entry is not the last entry of the node's finger table, method 200 proceeds to step 240. Step 240 increments the index i, thereby selecting the next finger table entry of the node's finger table. Following step 240, method 200 proceeds back to decision block 210. Steps 210, 215, 220, 225, 230, 235, and 240 may be repeated as many times as necessary to evaluate all of the entries of the node's finger table.

Figure 3A:
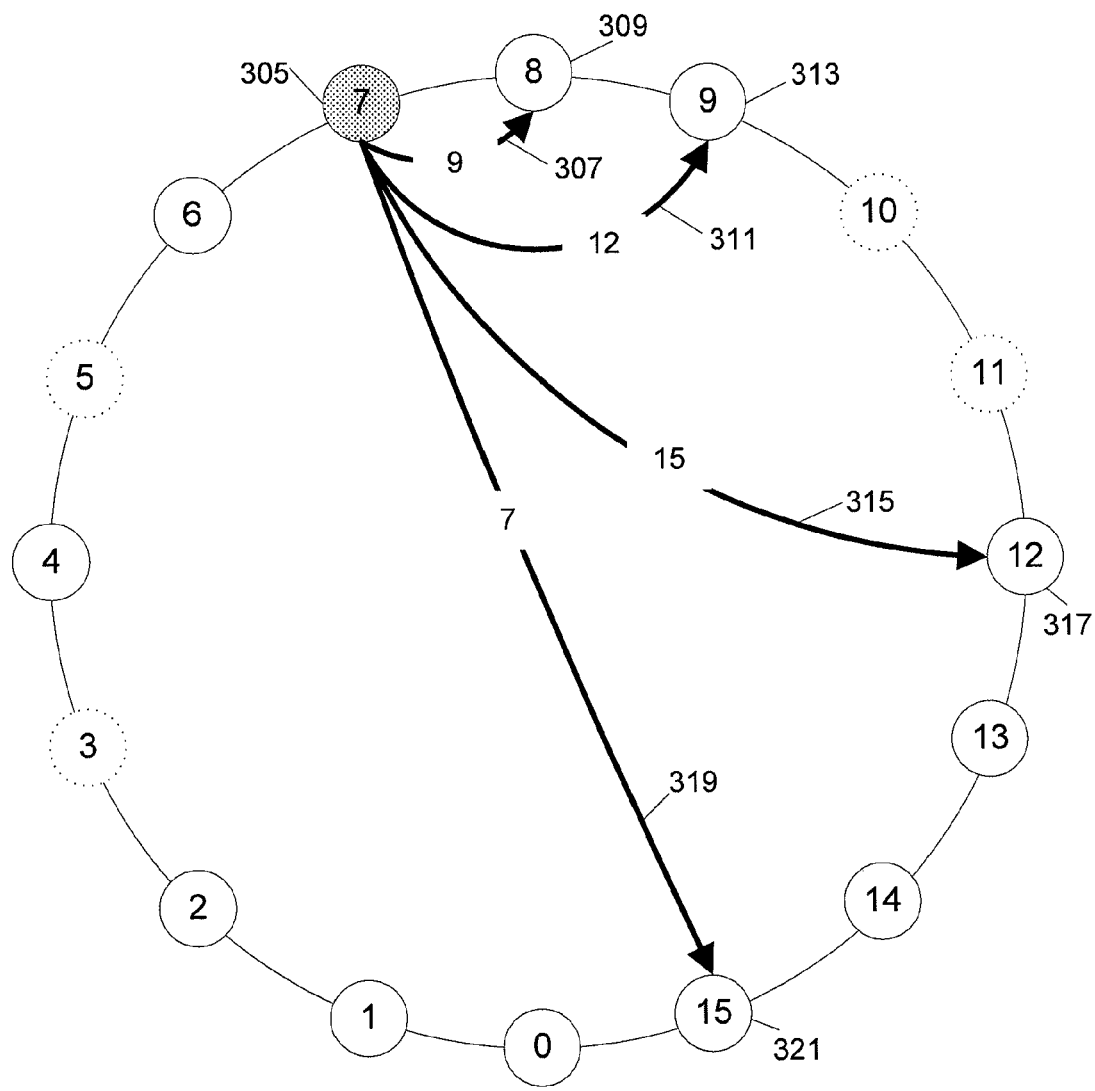
FIGS. 3A-C illustrate an example routing of a broadcast message in an overlay network according to an embodiment of the invention.
Figure 3B:
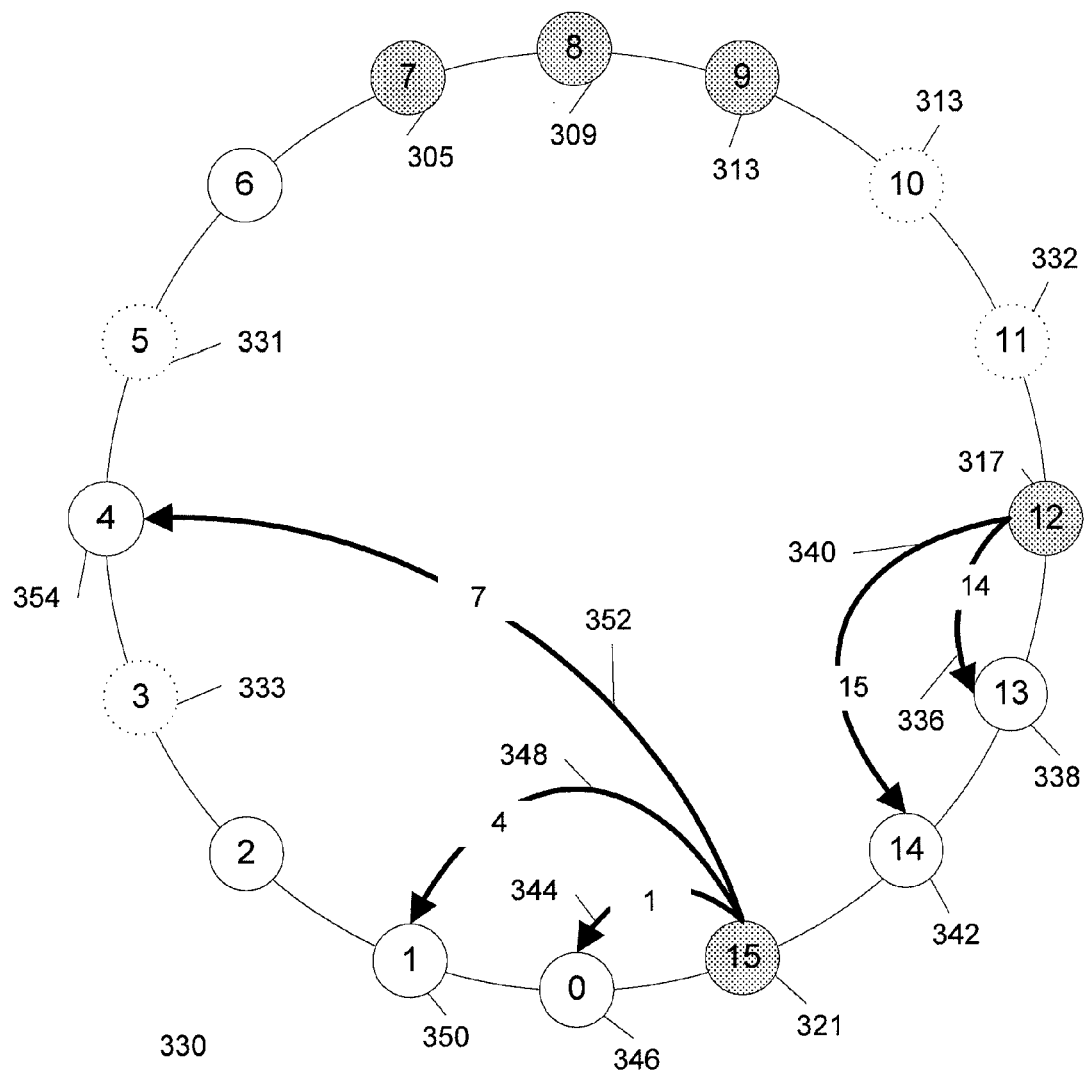
Figure 3C:
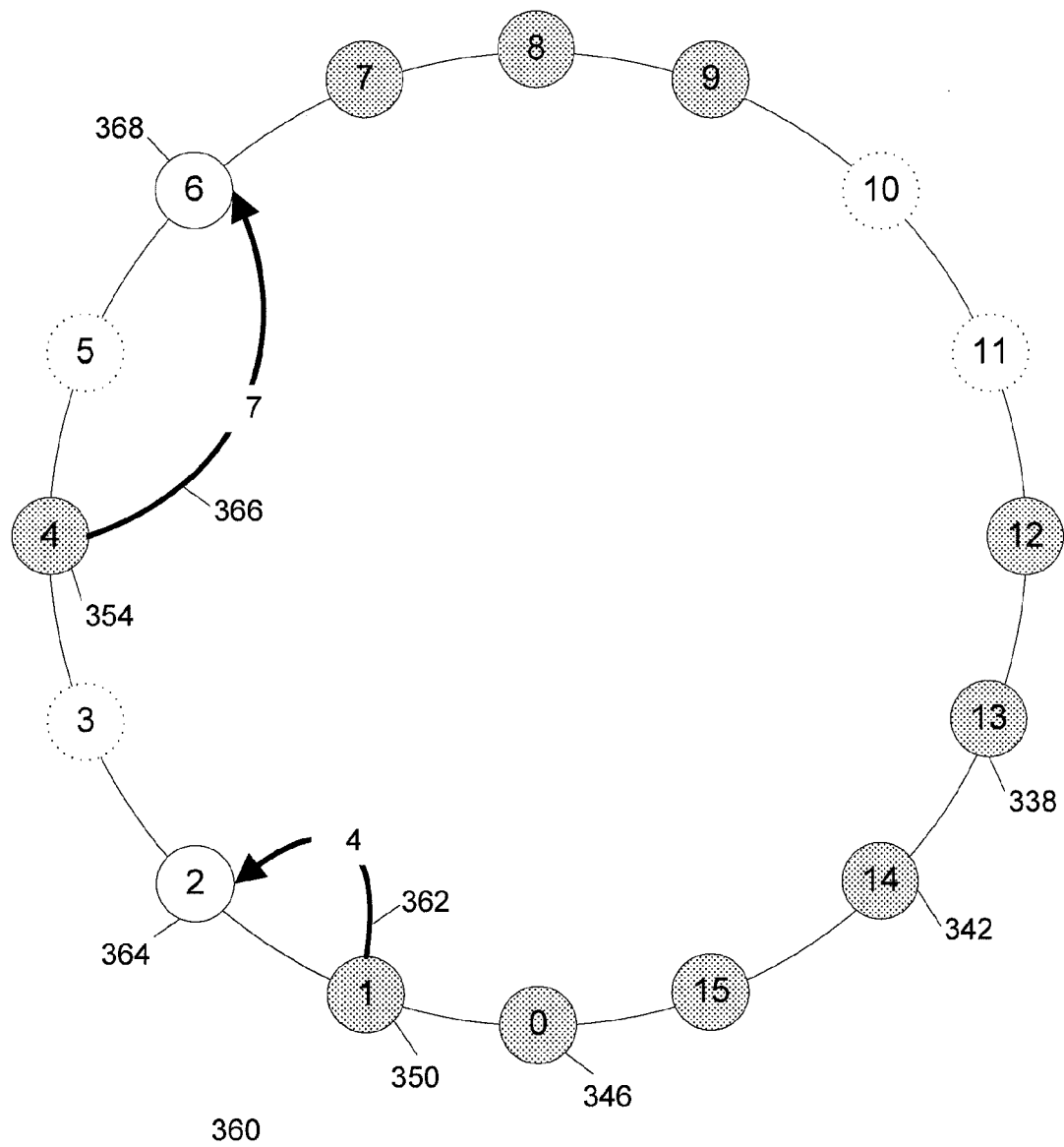

FIGS. 3A-C illustrate an example routing of a broadcast message in an overlay network according to an embodiment of the invention. In this example, an initiating node 305 desires to send a broadcast message to all of the nodes of the overlay network 300. FIG. 3A illustrates a first phase 300 of the delivery of the broadcast message to the nodes of the overlay network 300. In accordance with method 200, initiating node sends a broadcast message 307 with an End ID value of 9 to node 309, a broadcast message 311 with an End ID of 12 to node 313, a broadcast message 315 with an End ID of 15 to node 317, and a broadcast message 319 with an End ID of 7 to node 321.

FIG. 3B illustrates a second phase 330 of the delivery of the broadcast message to the nodes of the overlay network. In FIGS. 3B and 3C, shaded nodes have already received the broadcast message. In the second phase 330, nodes that received a broadcast message from the initiating node 305 in phase 300 will forward copies of the broadcast message in accordance with method 200. Thus, in phase 330, node 317 forwards a broadcast message 336 with an End ID of 14 to node 338 and a broadcast message 340 with an End ID of 15 to node 342. Similarly, node 321 forwards a broadcast message 344 with an End ID of 1 to node 346, a broadcast message 348 with an End ID of 4 to node 350, and a broadcast message 352 with an End ID of 7 to node 354.

Node 309 does not forward its received broadcast message to any nodes. In the first phase 300, node 309 received a broadcast message with an End ID of 9. As there are no finger nodes between node 309, with a key value of 8, and its received End ID value of 9, node 309 has no nodes to forward its received broadcast message to.

In the example of FIGS. 3A-3C, key values 3, 5, 10, and 11, assigned to locations 314, 331, 332, and 333, respectively, are not assigned to any nodes. Thus, the first entry of the finger table of node 313 references node 317, which as a key value of 12. However, node 313 received a broadcast message in phase 300 with an End ID value of 12. As node 313 does not have any nodes in its finger table closer than the End ID value of 12, node 313 does not have any nodes to forward its received broadcast message to.

FIG. 3C illustrates a third phase 360 of the delivery of the broadcast message to the nodes of the overlay network. In FIGS. 3B and 3C, shaded nodes have already received the broadcast message. In the third phase 360, nodes that received a broadcast message from nodes in the second phase 330 will forward copies of the broadcast message in accordance with method 200. Thus, in phase 360, node 350 forwards a broadcast message 362 with an End ID of 4 to node 364. Additionally, node 354 forwards a broadcast message 366 with an End ID of 7 to node 368.

Because of the End ID values of their received broadcast messages in phase 330, nodes 338, 342, and 346 will not forward any broadcast messages in phase 360. Similarly, the broadcast messages received by nodes 364 and 366 in phase 360 will not be forwarded to any other nodes in the overlay network due to their respective End ID values.

As can be seen from the example of FIGS. 3A-3C, every node in the overlay network receives a copy of the broadcast message. Additionally, no node in the overlay network receives a duplicate of the broadcast message. Furthermore, the initiating node only requires enough network bandwidth to send a copy of the broadcast message to each node in its finger table, regardless of the total number of nodes in the overlay network. For the example of FIGS. 3A-3C, this is only four broadcast messages. In an overlay network having nodes with 160 entry finger tables, corresponding to a hash space of $2^{160}$, the initiating node only needs to send 160 copies of the broadcast message to reach potentially millions of nodes.

Moreover, it can be proven that the method 200 is capable of directing a broadcast message to all of the nodes of an overlay network in $O(\log_2 N)$ time, where N is the number of the nodes in the overlay network. For the example of FIGS. 3A-3C, this corresponds to log 10=3.32 time, or approximately three phases of forwarding and receiving broadcast messages. For an example overlay network with a 160 bit hash space with 1,000,000 nodes, method 200 can direct a broadcast message to all of the nodes in approximately 20 time, or 20 phases of forwarding and receiving broadcast messages.

In a further embodiment, broadcast messages can be directed to only a portion of the nodes in an overlay network. In an embodiment, each broadcast message includes a Start ID parameter in addition to an End ID parameter. The Start ID parameter represents the beginning of a range of key values of nodes that are intended to receive and process the broadcast message. As explained in detail below, additional nodes outside of this range of key values may receive and forward broadcast messages to ensure that all of the nodes within this range of key values receive the broadcast message. In this embodiment, the Start ID and End ID together specify that the nodes of a contiguous portion of the hash space should receive a broadcast message. An initiating node can direct a broadcast message to discontiguous sets of nodes in the overlay network by sending multiple broadcast messages, each with Start ID and End ID values specifying different contiguous portions of the hash space.

Figure 4:
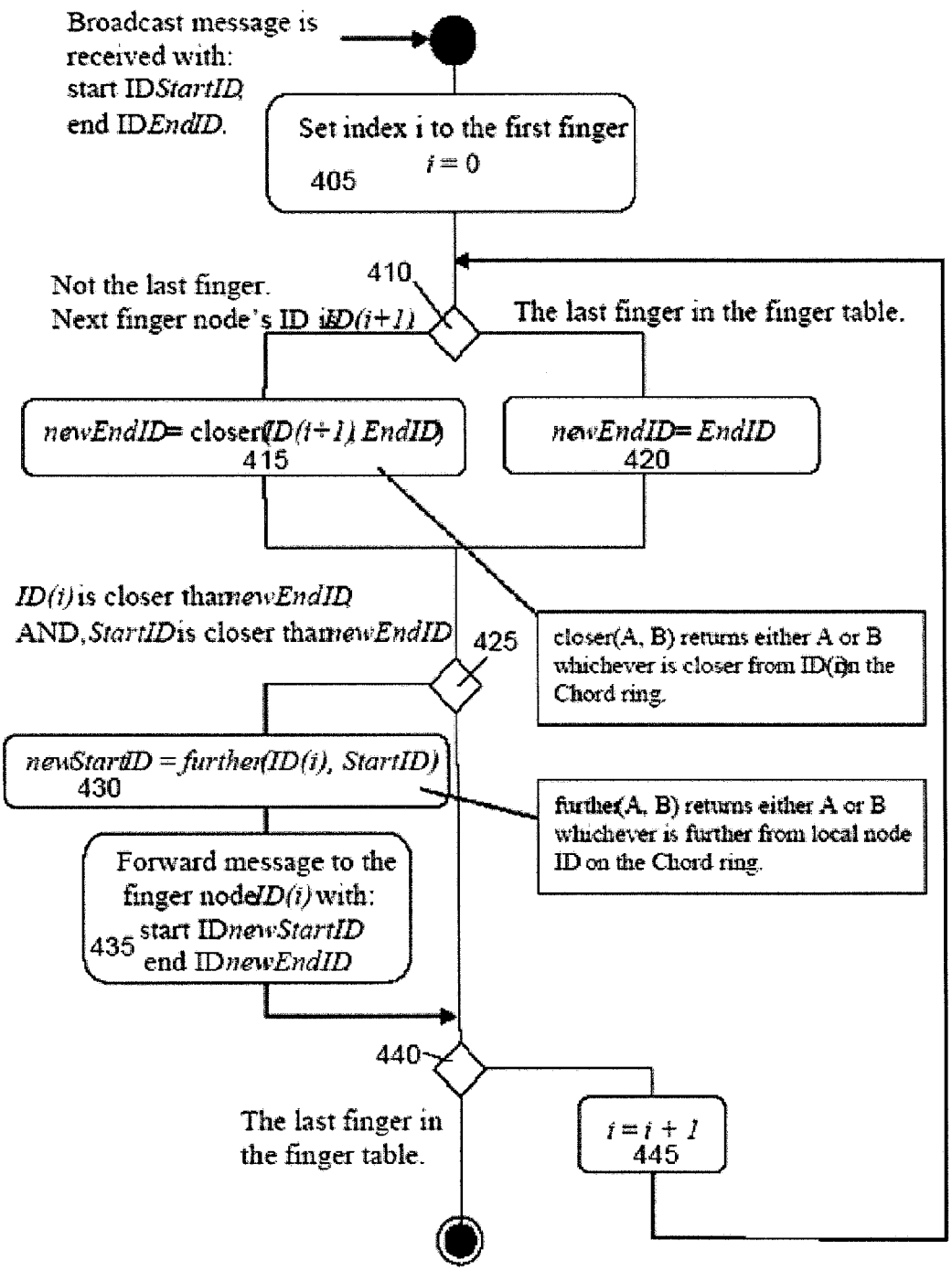
FIG. 4 illustrates a method of routing a broadcast message to a portion of an overlay network according to an embodiment of the invention.

FIG. 4 illustrates a method 400 of routing a broadcast message to a portion of an overlay network according to an embodiment of the invention. Method 400 begins with the receipt of a broadcast message including a Start ID parameter and an End ID parameter. In step 405, the node sets an index value i to the first entry of the node's finger table. In decision block 410, the node determines whether the finger table entry specified by the index value i, referred to as the selected finger table entry, is the last entry of the node's finger table. If so, then method 400 proceeds from decision block 410 to step 420. Step 420 assigns the parameter newEndID to be equal to the End ID of the received broadcast message.

Conversely, if the node determines that the selected finger table entry is not the last entry of the node's finger table, method 400 proceeds from decision block 410 to step 415. Step 415 assigns the parameter newEndID to be equal to the key value of the next finger table entry (i.e. the finger table entry specified by index i+1) or the End ID of the received broadcast message, whichever is closer to the current node in the hash space. The distance between the current node and a key value, such as the next finger table entry or the current End ID, can determined in an embodiment by subtracting the current node's key value from the other key value.

In this embodiment of step 415, it is assumed that the entries of the finger table are arranged in order of the key values of their respective nodes and that broadcast messages are to be communicated to nodes in order of increasing key values. However, in alternate embodiments, the finger table can be arranged in a different order and broadcast messages can be communicated in increasing or decreasing order of key values.

Following step 415 or step 420, method 400 proceeds to decision block 425. In decision block 425, the node determines if the key value of the selected finger table entry is less than the value of the newEndID parameter and if the Start ID parameter of the received broadcast message is closer than the newEndID parameter. If both of these conditions are true, then method 400 proceeds to step 430. Step 430 sets a newStartID parameter to be equal to the key value of the selected finger table entry or the StartID parameter of the received broadcast message, whichever is further from the current node in the hash space.

Following step 430, step 435 forwards a broadcast message to the node corresponding with the selected finger table entry. The forwarded broadcast message includes a start ID equal to the newStartID parameter and an end ID parameter equal to the newEndID parameter.

Following decision block 425 or step 435, method 400 proceeds to decision block 440. Decision block 440 determines if the selected finger table entry is the last entry of the node's finger table. If so, then method 400 ends and the node is finished forwarding the broadcast message.

If decision block 440 determines that the selected finger table entry is not the last entry of the node's finger table, method 400 proceeds to step 445. Step 445 increments the index i, thereby selecting the next finger table entry of the node's finger table. Following step 445, method 400 proceeds back to decision block 410. Steps 410, 415, 420, 425, 430, 435, 440, and 445 may be repeated as many times as necessary to evaluate all of the entries of the node's finger table.

Broadcast messages can carry any type of information to all or a portion of the nodes of the overlay network. Additionally, one or more nodes can respond to broadcast messages by directly contacting the node initiating the broadcast message. If large numbers of nodes can potentially respond to a broadcast message, the initiating node and its network connection may be overwhelmed.

A further embodiment of the invention alleviates this problem by aggregating response messages along the same routes used to distribute a broadcast message. In this embodiment, when each node receives a broadcast message that potentially requires a response from itself or another node, the receiving node remembers the location of the node sending the broadcast message, referred to as the sending node, which may be the node initiating the broadcast message or an intermediate node forwarding the broadcast message. If the receiving node determines that a response to the broadcast message is necessary, the receiving node forwards its response back to its respective sending node. As a node can receive a broadcast message from potentially any node, in an embodiment, each node remembers the sending node associated with each broadcast message it receives.

Figure 5:
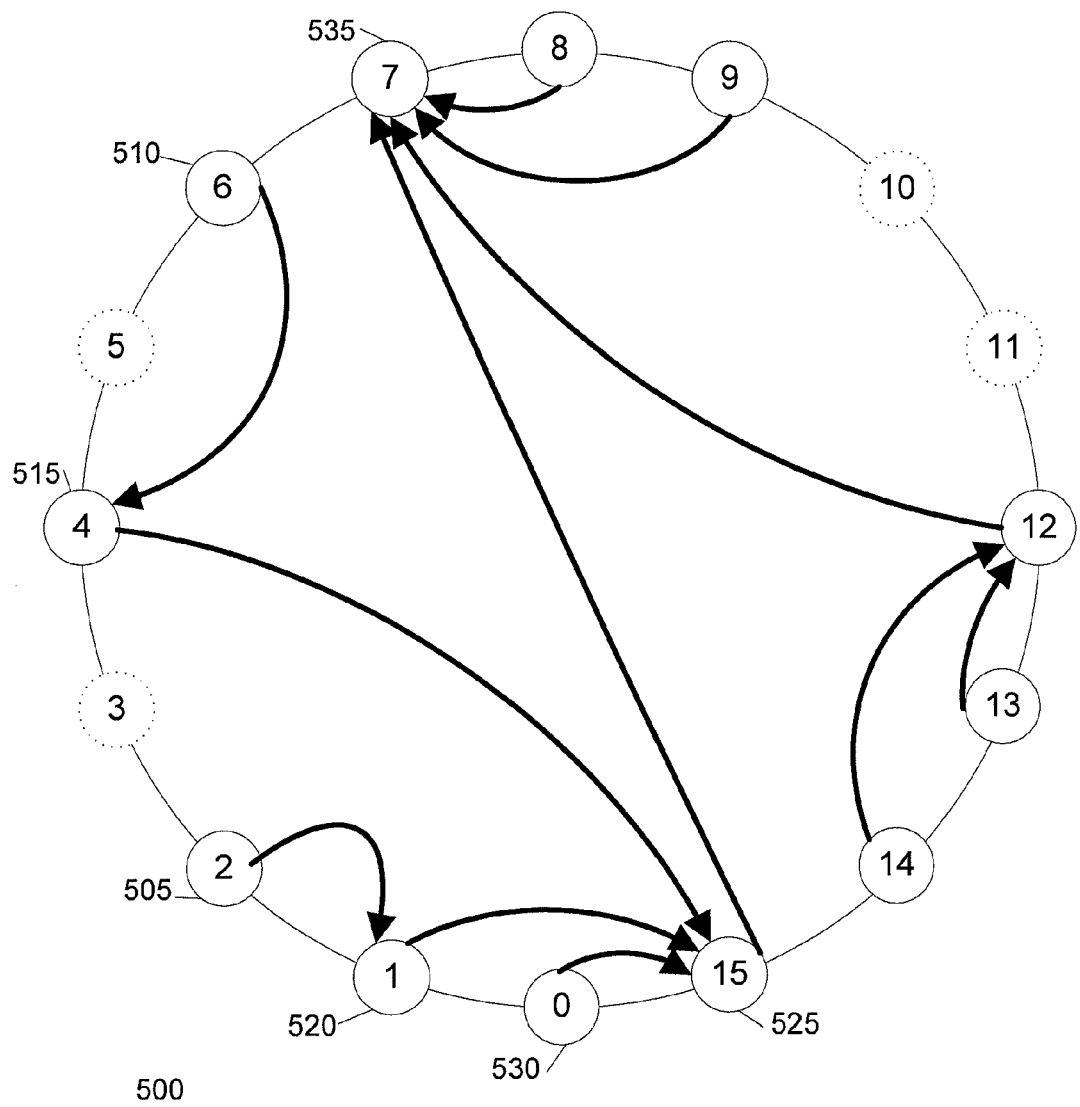
FIG. 5 illustrates a system for aggregating query results from the nodes of an overlay network according to an embodiment of the invention.

FIG. 5 illustrates a system for aggregating query results from the nodes of an overlay network according to an embodiment of the invention. An example overlay network 500 includes a set of nodes. The set of nodes are connected with an example initiating node 535 via a set of paths similar to that described in FIGS. 3A-3C. In an embodiment, a node responding to a broadcast message from the initiating node forwards its response to its respective sending node. For example, node 510 received a broadcast message initiated by node 535 via sending node 515. Thus, node 510 will provide its response message, if any, back to node 515. Similarly, node 515 received the broadcast message initiated by node 535 via node 525. Node 525 received the broadcast message directly from the initiating node 535. Thus, a response message from node 510 will travel via nodes 515 and 525 back to initiating node 535.

When a node receives a response message from one or more nodes, the node aggregates the response messages into a new response message, which is then forwarded back to its sending node. In an embodiment, nodes can choose not to respond to a broadcast message. For example, if the broadcast message is a search query, a node can choose to response only if the node satisfies the search query.

A node can aggregate response messages using any algorithm for compressing or aggregating data known in the art. For example, if nodes 505 and 510 both respond to a broadcast message, then node 525 will receive both responses. Node 525 can aggregate these responses, along with the response of node 530 and/or its own response, if any, into a combined response message. Node 525 then forwards the combined response message back to node 535.

In an embodiment, a node aggregates these responses by determining a compact representation of the set of responses. For example, a frequency domain transformation, such as a discrete cosine transformation, fast Fourier transform, or wavelet transformation, can be applied to determine a compact representation of the set of responses to a broadcast message. In this example, a node can receive one or more frequency domain representations of sets of message responses; inverse transform these representations; combine these representations along with the nodes own response, if any; create a new frequency domain representation of the combined sets of message responses; and forwards the combined frequency domain representation back to its sending node.

Figure 6:
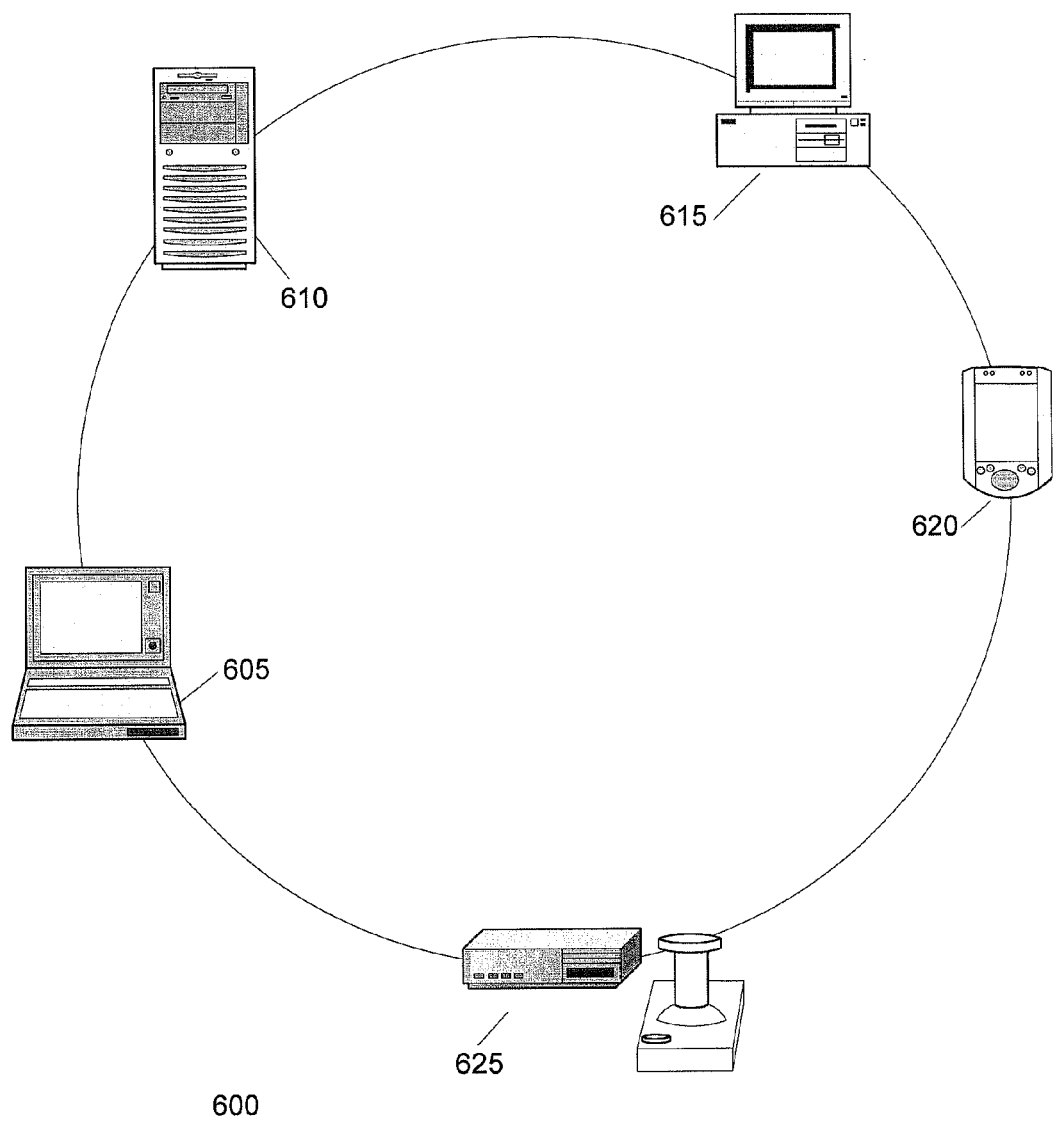
FIG. 6 illustrates a set of information processing devices suitable for implementing an overlay network according to an embodiment of the invention.

FIG. 6 illustrates a set of information processing devices suitable for implementing an overlay network 600 according to an embodiment of the invention. The nodes of overlay network 600 include laptop or portable computers 605; server computers 610; desktop computers and workstations 615; mobile computing devices 620 such as mobile phones, personal digital assistants, portable digital media players, and portable or handheld game consoles; and home entertainment devices 625 such as video game consoles, digital media players, set-top boxes, media center computers and storage devices. Overlay network 600 can include any number of each type of device independent of the number of devices of other types. Each device implement the functionality of one or more nodes of the overlay network 600. For each device, the functionality of one or more nodes can be implemented as hardware, software, firmware, or any combination thereof. Node functionality in software can be a part of an application, a library, an application programming interface, and/or an operating system. Furthermore, each node of the overlay network 600 can be connected with other nodes via any type of wired or wireless network connection, incorporating any type of electrical, optical, radio, or other communications means. The overlay network 600 can encompass both local-area networks and wide-area networks, such as the Internet.

In a further embodiment, some devices of overlay network 600 may have restricted capabilities. For example, only a limited subset of nodes of overlay network 600 may be allowed to initiate broadcast messages. The remaining nodes are only permitted to forward and/or process broadcast message. In still a further embodiment, all or a subset of the nodes of overlay network 600 are capable of authenticating broadcast messages. This embodiment prevents the spread of unauthorized broadcast messages. Upon receiving a broadcast message, a node first determines whether the broadcast message is authentic, for example by checking a cryptographic signature. If a broadcast message is authentic, it is processed and potentially forwarded to other nodes as described above. Otherwise, the broadcast message is ignored.

Figure 7:
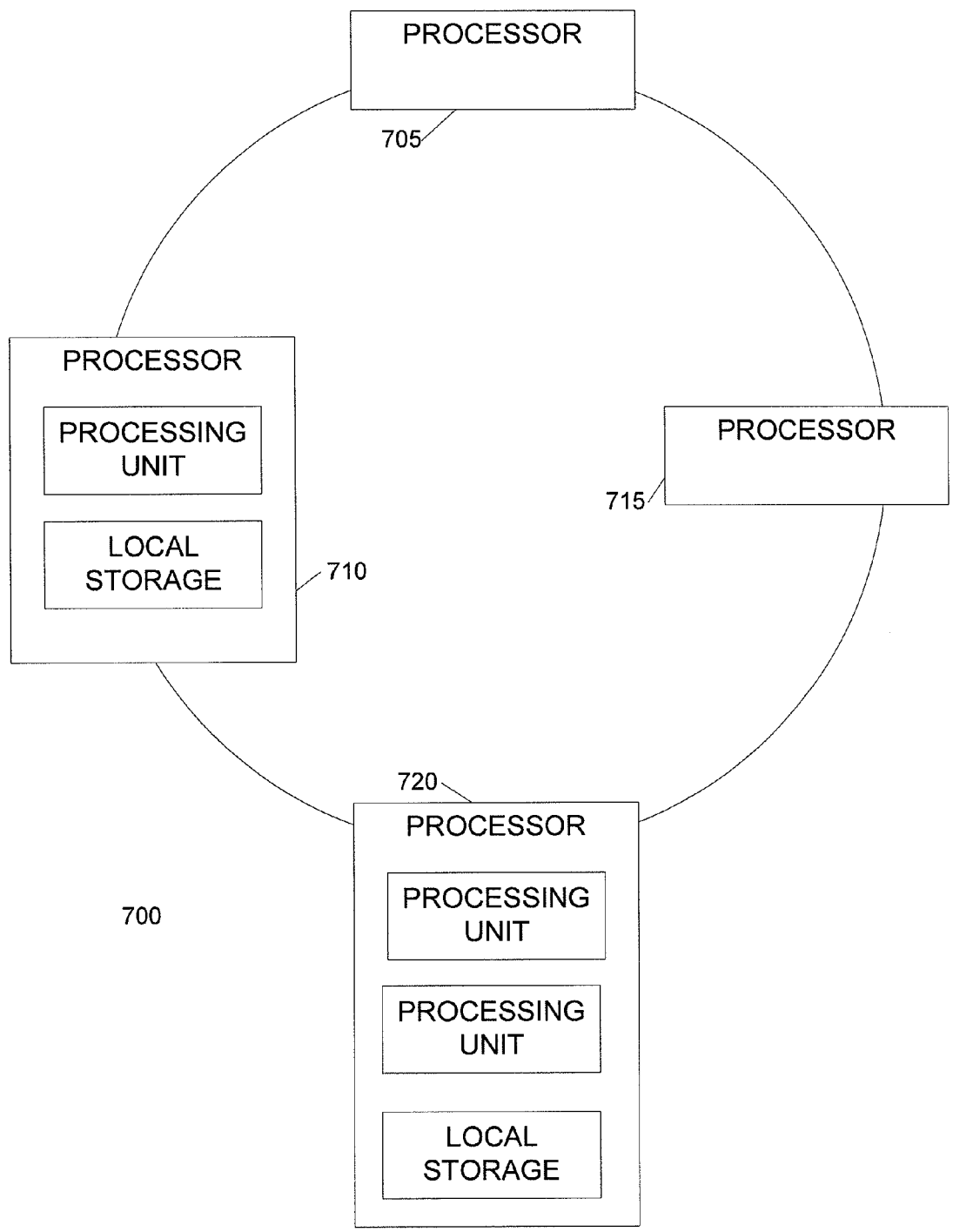
FIG. 7 illustrates a set of information processing devices suitable for implementing an overlay network according to an embodiment of the invention.

FIG. 7 illustrates a set of information processing devices suitable for implementing an overlay network 700 according to an embodiment of the invention. Overlay network 700 enables processors connected over a data bus to send and receive broadcast messages in an efficient manner. The data bus can use any electrical, optical, or other type of data communication means capable of carrying data within and/or between integrated circuits.

Overlay network 700 includes processors 705, 710, 715, and 720. In further embodiments, overlay network 700 can include thousands or millions of processors. Each processor can be a microprocessor, microcontroller, system on a chip processor, digital signal processor, ASIC, programmable logic device and/or any other type of information processing device. Each processor can further include one or more processing units capable of independently executing sequences of information processing instructions or processing information according to a fixed algorithm. Each processor can include local data storage as well as access to common or shared data storage.

Figure 8:
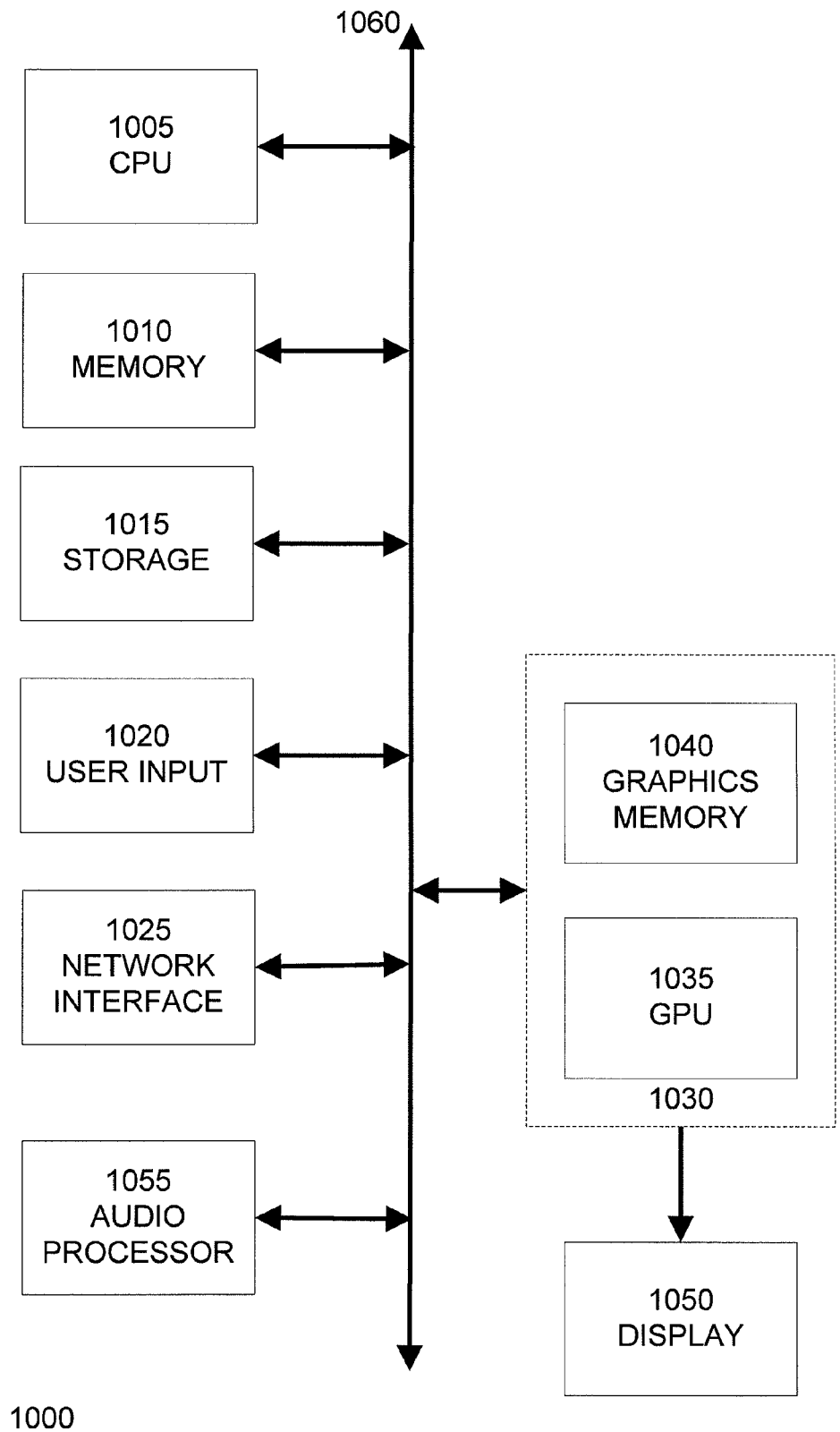
FIG. 8 illustrates the components of an information processing device suitable for implementing a node of an overlay network according to an embodiment of the invention.

FIG. 8 illustrates the components of an information processing device suitable for implementing a node of an overlay network according to an embodiment of the invention. FIG. 8 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, UMD, or other optical storage devices. Various methods described herein can be encoded in an information storage medium including instructions adapted to direct an information processing device to perform an operation, where the information storage medium can comprise a memory and/or storage device including those described above, such as may include RAM, ROM, EEPROM, flash memory, CD-ROM, DVD-ROM, or other optical or magnetic storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Figure 9:
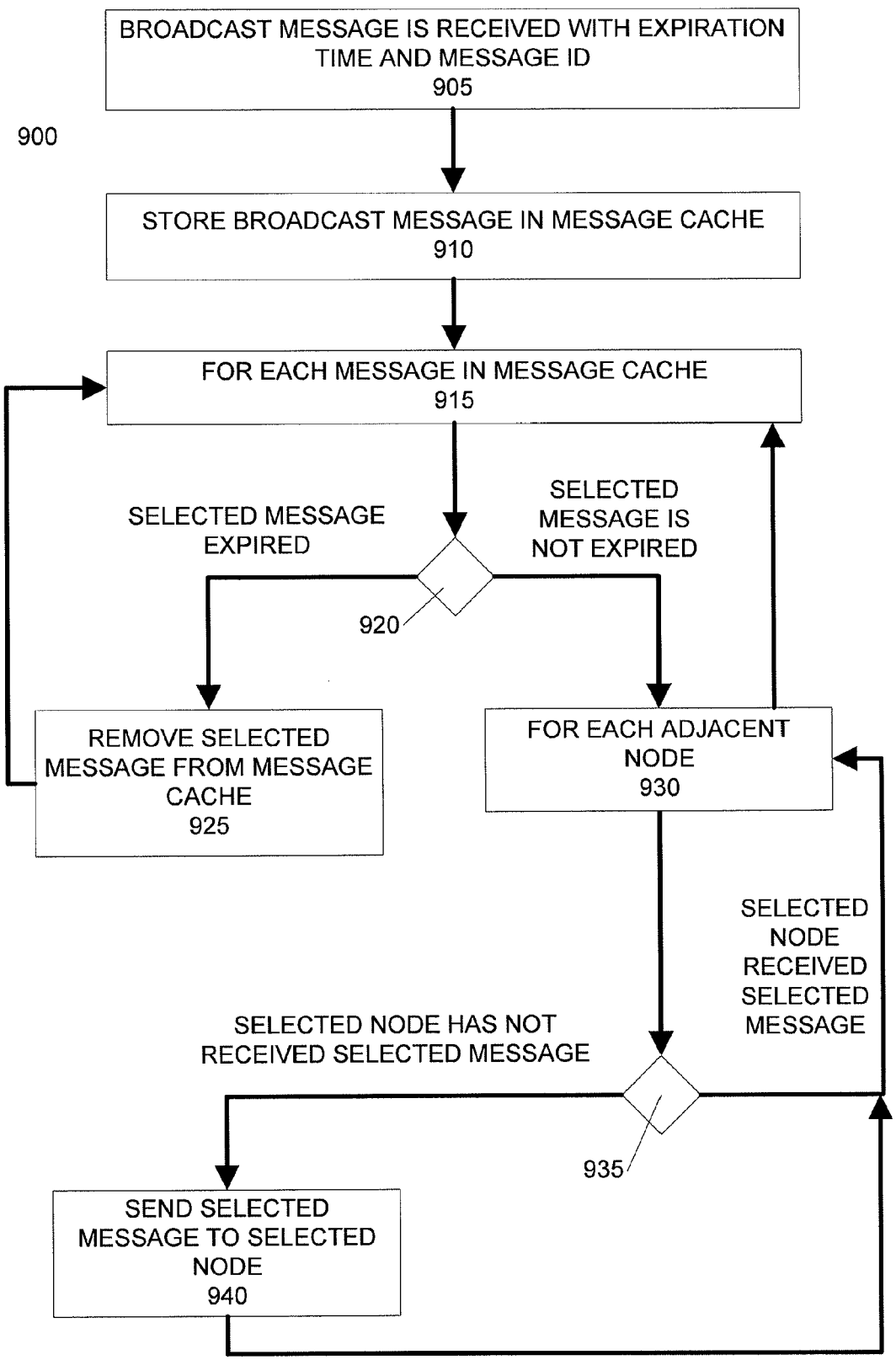
FIG. 9 illustrates an example method according to an embodiment of the invention.

FIG. 9 illustrates an example method 900 that can be used according to an embodiment of the invention. In step 905, a broadcast message is received with an expiration time and a message ID. In step 910, the broadcast message is stored in a message cache. In step 915, for each message in the message cache, a determination is made at 920 whether the selected message expired. If the selected message expired, the selected message is removed from the message cache in step 925. If the selected message is not expired, then for each adjacent node at 930, a decision is made at 935 whether the selected node received the selected message. If the selected node has received the selected message, the method continues at step 930. If the selected node has not received the selected message, the selected message is sent to the selected node at step 940 and the process continues from step 930.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of broadcasting a message, comprising:
    assigning a unique key value to each of a plurality of nodes in a set of network nodes;

causing each node to store at least one reference to another node based at least in part upon an offset from the key value of the respective node;

determining an initial key range for a message to be broadcast to each node in the set; and from a sending node, sending a copy of the message to each receiving node in the set of network nodes having a reference stored by the sending node with a key value within the initial key range, wherein each receiving node is further able to determine an updated key range, based at least in part upon the references stored by the respective receiving node, and broadcast a copy of the message to other nodes in the set of network nodes having a key value within the updated key range and a reference stored by the respective receiving node.

2. The method of claim 1, wherein each node stores the at least one reference to another node in a finger table for that node.

3. The method of claim 1, wherein the initial key range is determined by at least one of a start identifier and an end identifier of the message to be broadcast.

4. The method of claim 1, wherein each receiving node is able to determine an updated key range by selecting a reference to a finger node from a respective finger table and determining if there is a following entry of the finger table including a key value adjacent to the key value of the selected finger table entry according to a node order, an occurrence of such a following entry causing initial key range to be updated to include the key value associated with the following entry.

5. The method of claim 4, wherein the node order is ascending or descending according to key values.

6. The method of claim 1, further comprising:
receiving a response message from at least one node in response to the forwarded copy of broadcast message.

7. The method of claim 6, wherein:
the response message includes aggregated responses from multiple finger nodes.

8. The method of claim 7, wherein the response message, including aggregated responses, is generated using a frequency domain transformation to create a compact representation of response messages from the multiple finger nodes.

9. A method of processing a broadcast message in a peer to peer network, the method comprising:
receiving a broadcast message from a sending node in the peer to peer network to a first receiving node, the broadcast message specifying an initial key value range;
generating an updated key value range to include a key value associated with at least a second receiving node when the first receiving node has a reference to the second receiving node having a key value outside the initial key value range; and
forwarding a copy of the broadcast message with the updated key value range from the first receiving node to at least one finger node having a key value within the updated key value range and a reference stored by the first receiving node.

10. The method of claim 9, wherein the updated key value range is generated to include a key value associated with at least a second receiving node when the first receiving node has a reference to the second receiving node that includes a key value adjacent to a key value of a selected node reference stored by the first receiving node according to a node order.

11. The method of claim 9, wherein each node stores references to at least two nodes arranged according to their respective key values.

12. The method of claim 9, wherein each node stores references to at least one node in a respective finger table.

13. A non-transitory computer-readable storage medium for broadcasting a message, the non-transitory computer-readable storage medium storing instructions that, when executed by a processor, cause the processor to:
assign a unique key value to each of a plurality of nodes;
cause each node to store at least one reference to another node based at least in part upon an offset from the key value of the respective node;
determine an initial key range for a message to be broadcast to each node; and
from a sending node in the overlay network, send a copy of the message to each receiving node having a reference stored by the sending node with a key value within the initial key range,
wherein each receiving node is further able to determine an updated key range, based at least in part upon the references stored by the respective receiving node, and broadcast a copy of the message to other nodes in the overlay network having a key value within the updated key range and a reference stored by the respective receiving node.

14. The non-transitory computer-readable storage medium of claim 13, wherein each node stores the at least one reference to another node in a finger table for that node.

15. The non-transitory computer-readable storage medium of claim 13, wherein each receiving node is able to determine an updated key range by selecting a reference to a finger node from a respective finger table and determining if there is a following entry of the finger table including a key value adjacent to the key value of the selected finger table entry according to a node order, an occurrence of such a following entry causing initial key range to be updated to include the key value associated with the following entry.

16. The non-transitory computer-readable storage medium of claim 13, wherein the instructions when executed further cause the processor to:
receive a response message from at least one node in response to the forwarded copy of broadcast message, the response message includes aggregated responses from multiple finger nodes.

17. A system for broadcasting a message, comprising:
a processor; and
memory storing instructions that, when executed by the processor, cause the processor to:
assign a unique key value to each of a plurality of nodes;
cause each node to store at least one reference to another node based at least in part upon an offset from the key value of the respective node;
determine an initial key range for a message to be broadcast to each node; and
from a sending node in the overlay network, send a copy of the message to each receiving node having a reference stored by the sending node with a key value within the initial key range,
wherein each receiving node is further able to determine an updated key range, based at least in part upon the references stored by the respective receiving node, and broadcast a copy of the message to other nodes in the overlay network having a key value within the updated key range and a reference stored by the respective receiving node.

18. The system of claim 17, wherein each node stores the at least one reference to another node in a finger table for that node.

19. The system of claim 17, wherein each receiving node is able to determine an updated key range by selecting a reference to a finger node from a respective finger table and determining if there is a following entry of the finger table including a key value adjacent to the key value of the selected finger table entry according to a node order, an occurrence of such a following entry causing initial key range to be updated to include the key value associated with the following entry.

20. The system of claim 17, wherein the instructions when executed further cause the processor to:

receive a response message from at least one node in response to the forwarded copy of broadcast message, the response message includes aggregated responses from multiple finger nodes.

\* \* \* \* \*